Patented June 26, 1945

2,379,292

UNITED STATES PATENT OFFICE 2,379,292

COPOLYMERIZATES OF ISOOLEFINS AND VINYL HALIDES AND PROCESS OF PREPARING THE SAME

Anthony H. Gleason, Westfield, N. J., assignor to Standard Oil Development Company, a corporation of Delaware No Drawing. Application November 22, 1941, Serial No. 420,081

12 Claims. (Cl. 260—86)

This invention relates to polymeric resinous substances; relates particularly to polymers, interpolymers or copolymers of vinyl halides with isoolefins; and relates especially to the process for and product from the interpolymerization of vinyl halides such as vinyl chloride with isoolefins such as isobutylene.

In the prior art of the production of synthetic resins, a wide variety of polymerization reactions have been discovered, and a wide range of different polymers are known. It is, however, desirable that polymers should be produced containing substantial proportions of chlorine, and to the present great difficulty has been encountered in producing chlorine-containing synthetic resins having the desired characteristics.

The present invention provides an interpolymer of vinyl chloride and isobutylene which is thermoplastic, soluble in various solvents, and when free from solvent forms a tough, transparent, glassy material which is highly satisfactory for a wide range of uses including films, surface coatings, solid objects, components of paints, varnishes and lacquers, etc. and a wide range of other uses both in the pure form, and when mixed with a wide range of substances such as solid pigments, rubber and rubber-like substances and other resinous substances for which it may serve as toughener, or with which the other substances may serve as a plasticizer.

The process of the invention consists of the preparation of a mixture of a vinyl halide such as vinyl chloride and an olefin such as isobutylene under pressure, in the presence of water, an emulsifying agent and a suitable catalyst substance. This mixture is then heated with suitable mixing at a substantially elevated temperature well above room temperature until the reaction is substantially complete.

Thus, an object of the invention is to interpolymerize an olefin such as isobutylene with a vinyl halide such as vinyl chloride to produce a fairly tough, flexible, transparent resin. Other objects and details of the invention will be apparent from the following description.

Broadly, the invention consists in the preparation of a mixture of a vinyl halide such as vinyl chloride or vinyl bromide or analogous vinyl compounds, singly or in admixture, with an olefin such as isobutylene, or 3 methyl butene-1, or the like. The mixture is further admixed with water containing an emulsifying agent such as the sodium salt of monolauryl sulfate or sodium or potassium stearate or oleate or dodecyl amine hydrochloride or other emulsifying agent, together with a per salt or a peroxide such as ammonium persulfate, sodium persulfate, potassium persulfate, benzoyl peroxide, hydrogen peroxide or other similar peroxide. The ratio of the reactance may be in the range of from about 1.4 parts of the vinyl compound to 1 part of isoolefin up to 20 of the vinyl compound to 1 part of isoolefin; the water may be present in the proportion of 1 to 5 parts by weight of the weight of the reactants; the soap or emulsifying agent may be present to the extent of 1 to 3% of the water employed and the peroxide catalyst may be present to the extent of 0.1% to 1.0% of the water employed. The polymerization temperature may range from approximately 45° C. to approximately 100° C., and the time of polymerization may range from a few hours to several days, depending upon the proportions of the polymerizable substances, the proportion of catalyst present, the temperature and other variables.

The resulting polymer may contain from 2 to 30% of isoolefin depending upon the proportions of the original mixture, and to some extent on the character of the catalyst, on the polymerization temperature and other factors. The resulting copolymer is soluble in a considerable number of hydrocarbons and hydrocarbon solvents from which it may be separated by precipitation as for example by a lower alcohol, or the solvent may be evaporated to leave the material in a film or other desired form. The polymer is compatible with and may be mixed with a wide range of other substances, both inert pigments and solids generally and with a considerable number of other resinous and rubbery substances both natural and artificial. The polymer in the pure form is a water-white, transparent, thermoplastic resin which is flexible but has a low elongation and is somewhat brittle. Suitable plasticizers such as tricresyl phosphate, dibutyl phthalate, triacetin, and the like are capable, however, of rendering it pliable and even rubber-like in nature when mixed in proper proportions.

Example 1

100 parts of vinyl chloride (liquid monomer) were mixed with 70 parts of liquid isobutylene at a temperature at or below −15° C., such that the isobutylene and vinyl chloride remained in liquid form. This mixture was then charged to a bomb containing a mixture of 300 parts of water, 7½ parts of sodium oleate, and approximately 1 part of potassium persulfate. The acidity of this solution had been adjusted by the addition of acid to a pH of 8.5. The bomb and contents were then brought up to a temperature of 65° C. It was shaken and stirred at that temperature for a time interval of approximately 100 hours. At the end of that time approximately 85 parts of solid polymer were obtained and 85 parts of liquefiable gas were recovered. The pH had dropped to a value of 7.45. The polymer was precipitated from the emulsion by the addition of a salt solution to the emulsion which served to break the emulsion and coagulate the solid polymer. The resulting crude polymer was dissolved in benzol and reprecipitated therefrom with methanol in order to removed non-polymer impurities and low molecular weight polymers. The product was then dried in a vacuum oven at 70° C.

A proximate analysis of the resin showed it to contain:

|  | Per cent |
|---|---|
| Carbon | 47.76 |
| Hydrogen | 6.76 |
| Chlorine | 44.00 |
| Ash | 0.68 |

These figures indicate an isobutylene content in the interpolymer of 16% to 18%.

The purified resin was, as above indicated, a glassy, water-white, resin, thermoplastic and fusible at temperatures of 60° C. to 100° C.

This reaction is a general one and applicable to vinyl compounds generally including vinyl chloride, vinyl bromide, vinyl iodide, and other vinyl compounds. The reaction is similarly applicable with a wide range of olefinic material of which isobutylene is the preferred one, and the most satisfactory one. Other olefins are, however, similarly usable including as above indicated both isoolefins, and in some instances the normal monoolefins.

The resulting resin is compatible with a considerable range of other substances including polyisobutylene as such, the recently discovered low temperature interpolymer of an isoolefin and a diolefin, the polmers of butadiene and interpolymers thereof with methacrylates, acrylates, etc., and a considerable number of natural resins including various of the natural paint resins, gums and many of the synthetic resins.

The material is thermoplastic and readily adapted to molding for the formation of clear, white, glassy articles such as drinking glasses, lenses and other useful and ornamental articles. The material is readily colored by various of the dyestuffs for the production of colored molded objects. The material is compatible with a wide range of pigments such as white lead, lithopone, bayrites, lead chromate, chromic oxide, ferric oxide, vermilion, the various lakes with aluminum compounds, various organic substances including wood flour, wood pulp, cotton linters, ground cork and a wide range of similar substances.

The material likewise is readily deposited from solution, either by precipitation or by evaporation of the solvent. The latter procedure permits of the use of the material for a surface coating analogous to paint either as the pure resin, or with a wide range of pigments and other paint fillers. Similarly the material may be coated and stripped in a manner much like that used for the manufacture of Celluloid films.

The invention thus provides a process for the interpolymerization of an isoolefin with a vinyl compound to produce a tough, flexible, thermoplastic, transparent, white resin suitable for a wide range of coating, molding and film forming uses.

While there are above disclosed but a limited number of embodiments of the invention, it is possible to produce still other embodiments without departing from the inventive concept herein disclosed and it is, therefore, desired that such alternative embodiments be included within the scope of the claims subjoined hereto.

The invention claims:

1. The polymerization process which comprises the steps of mixing a vinyl halide with an isomonoolefin containing 4 to 5 carbon atoms per molecule in a ratio of from about 1.4 to about 20 parts of vinyl halide per part of isoolefin, emulsifying the mixture in an aqueous medium together with a peroxide catalyst adjusting the pH to about 8.5 and maintaining the reaction mixture at a temperature above room temperature but not above 100° C. for a sufficient length of time to cause a substantial copolymerization of the vinyl halide and isoolefin.

2. The polymerization process which comprises the steps of mixing a vinyl halide with an isomonoolefin containing 4 to 5 carbon atoms per molecule in a ratio of from about 1.4 to about 20 parts of vinyl halide per part of isoolefin, emulsifying the mixture in an aqueous medium comprising a soap solution together with a peroxide catalyst adjusting the pH to about 8.5 and maintaining the reaction mixture at a temperature above room temperature but not above 100° C. for a sufficient length of time to cause a substantial copolymerization of the vinyl halide and isoolefin.

3. The polymerization process which comprises the steps of mixing a vinyl halide with an isomonoolefin containing 4 to 5 carbon atoms per molecule in a ratio of from about 1.4 to about 20 parts of vinyl halide per part of isoolefin, emulsifying the mixture in an aqueous medium together with a peroxide catalyst adjusting the pH to about 8.5 and maintaining the reaction mixture at a temperature but not above 100° C. above room temperature for a sufficient length of time to cause a substantial copolymerization of the vinyl halide and isoolefin, separating the polymer from the reaction mixture, dissolving it in a solvent and reprecipitating the polymer from the solvent.

4. The polymerization process which comprises the steps of mixing vinyl chloride with isobutylene in a ratio of from about 1.4 to about 20 parts of vinyl chloride per part of isobutylene, emulsifying the mixture in aqueous medium together with a peroxide catalyst adjusting the pH to about 8.5 and maintaining the reaction mixture at a temperature above room temperature but not above 100° C. for a sufficient length of time to cause a substantial copolymerization of the vinyl chloride and isobutylene.

5. The polymerization process which comprises the steps of mixing vinyl chloride with isobutylene in a ratio of from about 1.4 to about 20 parts of vinyl chloride per part of isobutylene, emulsifying the mixture in an aqueous medium comprising a soap solution together with a peroxide catalyst adjusting the pH to about 8.5 and maintaining the reaction mixture at a temperature above room temperature for a sufficient length of time to cause a substantial copolymerization of the vinyl chloride and isobutylene.

6. The polymerization process which comprises the steps of mixing vinyl chloride with isobutylene in a ratio of from about 1.4 to about 20 parts of vinyl chloride per part of isobutylene, emulsifying the mixture in an aqueous medium comprising a soap solution together with a peroxide catalyst comprising an alkali persulfate adjusting the pH to about 8.5 and maintaining the reaction mixture at a temperature above room temperature but not above 100° C. for a sufficient length of time to cause a substantial copolymerization of the vinyl chloride and isobutylene.

7. The polymerization process which comprises the steps of mixing vinyl chloride with isobutylene in a ratio of from about 1.4 to about 20 parts of vinyl chloride per part of isobutylene, emulsifying the mixture in an aqueous medium comprising a soap solution together with a peroxide catalyst adjusting the pH to about 8.5, maintaining the reaction mixture at a temperature above room temperature but not above 100° C. for a sufficient length of time to cause a substantial copolymerization of the vinyl chloride and isobutylene and precipitating the polymer from the emulsion by the addition thereto of a salt solution.

8. The polymerization process which comprises the steps of mixing vinyl chloride with isobutylene in a ratio of from about 1.4 to about 20 parts of vinyl chloride per part of isobutylene, emulsifying the mixture in an aqueous medium comprising a soap solution together with a peroxide catalyst adjusting the pH to about 8.5, maintaining the reaction mixture at a temperature above room temperature but not above 100° C. for a sufficient length of time to cause a substantial copolymerization of the vinyl chloride and isobutylene, precipitating the polymer from the emulsion by the addition thereto of a salt solution and dissolving the crude polymer in an organic solvent and reprecipitating the polymer by the addition of a lower alcohol.

9. An interpolymer of a vinyl halide and an isomonoolefin of 4 to 5 carbon atoms per molecule, said interpolymer being a transparent, glassy, thermoplastic material produced by the process of claim 1.

10. An interpolymer of a vinyl halide and an isomonoolefin of 4 to 5 carbon atoms per molecule, said interpolymer being a transparent, glassy, thermoplastic material produced by the process of claim 3.

11. An interpolymer of vinyl chloride and isobutylene, said interpolymer being a transparent, glassy, thermoplastic material produced by the process of claim 5.

12. An interpolymer of vinyl chloride and isobutylene, said interpolymer being a transparent, glassy, thermoplastic material produced by the process of claim 8.

ANTHONY H. GLEASON.